United States Patent
Oono et al.

(10) Patent No.: US 11,380,947 B2
(45) Date of Patent: Jul. 5, 2022

(54) RACK-TYPE POWER SUPPLY DEVICE

(71) Applicant: SANYO Electric Co., Ltd., Daito (JP)

(72) Inventors: Yasuhiro Oono, Osaka (JP); Yasuhiro Watanabe, Osaka (JP); Toshikazu Ura, Osaka (JP); Masahiro Kawabata, Osaka (JP)

(73) Assignee: SANYO Electric Co., Ltd., Daito (JP)

( * ) Notice: Subject to any disclaimer, the term of this patent is extended or adjusted under 35 U.S.C. 154(b) by 394 days.

(21) Appl. No.: 16/481,664

(22) PCT Filed: Oct. 12, 2017

(86) PCT No.: PCT/JP2017/036943
§ 371 (c)(1),
(2) Date: Jul. 29, 2019

(87) PCT Pub. No.: WO2018/142674
PCT Pub. Date: Aug. 9, 2018

(65) Prior Publication Data
US 2020/0006821 A1    Jan. 2, 2020

(30) Foreign Application Priority Data

Jan. 31, 2017 (JP) .............................. JP2017-015182

(51) Int. Cl.
*H02J 7/00* (2006.01)
*H01M 10/627* (2014.01)
(Continued)

(52) U.S. Cl.
CPC ..... *H01M 10/627* (2015.04); *H01M 10/4257* (2013.01); *H01M 10/441* (2013.01);
(Continued)

(58) Field of Classification Search
None
See application file for complete search history.

(56) References Cited

U.S. PATENT DOCUMENTS

| 2013/0216874 A1 | 8/2013 | Endo et al. |
| 2015/0162651 A1 | 6/2015 | Nakahama et al. |
| 2016/0021782 A1* | 1/2016 | Kurosaki ............ H01M 10/627 429/71 |

FOREIGN PATENT DOCUMENTS

| JP | 2005-243580 A | 9/2005 |
| JP | 2013-171796 A | 9/2013 |

(Continued)

*Primary Examiner* — Arun C Williams
(74) *Attorney, Agent, or Firm* — WHDA, LLP

(57) ABSTRACT

The rack-type power supply device includes a plurality of battery modules each of which accommodates a plurality of secondary battery cells, a rack main body that vertically accommodates battery modules in a horizontal posture like a plurality of steps with gaps between the battery modules, and a plurality of cooling fans that are arranged on a front surface side of the rack main body and blow cooling air into the gaps between battery modules. The rack main body also includes a back-side duct in which cooling air having passed through the gaps flows upward on a back surface side of the battery modules. In addition, rack main body includes an air outlet for discharging cooling air having passed through the back-side duct on a top surface side. The cooling fan is disposed to be shifted from the gap between the battery modules in front view of the rack main body.

18 Claims, 12 Drawing Sheets

(51) Int. Cl.
  *H01M 10/613* (2014.01)
  *H01M 10/617* (2014.01)
  *H01M 10/6557* (2014.01)
  *H01M 10/6563* (2014.01)
  *H01M 10/6566* (2014.01)
  *H01M 10/42* (2006.01)
  *H01M 10/44* (2006.01)
  *H01M 50/20* (2021.01)

(52) U.S. Cl.
  CPC ....... *H01M 10/613* (2015.04); *H01M 10/617* (2015.04); *H01M 10/6557* (2015.04); *H01M 10/6563* (2015.04); *H01M 10/6566* (2015.04); *H01M 50/20* (2021.01); *H02J 7/0068* (2013.01); *H01M 2010/4271* (2013.01); *H01M 2220/10* (2013.01)

(56) References Cited

FOREIGN PATENT DOCUMENTS

| | | |
|---|---|---|
| JP | 2015-115167 A | 6/2015 |
| JP | 2016-31918 A | 3/2016 |

* cited by examiner

RACK-TYPE POWER SUPPLY DEVICE

TECHNICAL FIELD

The present invention relates to a rack-type power supply device configured by accommodating a plurality of battery modules including a plurality of chargeable and dischargeable secondary battery cells in a rack.

BACKGROUND ART

Rack-type power supply devices in which a large number of secondary batteries are connected in series and parallel are used for various applications including backup power supplies for servers, buildings, and factories, power storage for peak-cut, and power drive. FIG. 12 is a schematic cross-sectional view of an example of such power supply devices. In the power supply device illustrated in the drawing, a large number of plate-like battery modules 101 in a horizontal posture in which a large number of secondary battery cells are connected in series and/or in parallel are arranged in rack 102 to be parallel to each other. As the secondary battery cells generate heat by charging and discharging, the power supply device preferably includes a cooling mechanism. In the example of FIG. 12, a plurality of radiation fans 105 are disposed on a back surface side of rack 102. As indicated by arrows, radiation fan 105 sucks air from a front surface side of rack 102 and discharges air from the back surface side. As a result, radiation fan 105 forcibly produces an air flow and causes air to flow into gap 103 between battery modules 101, thus cooling the power supply device with cooling air.

In this configuration, it is necessary to discharge cooling air from the back surface side of rack 102. For this reason, rack 102 must be disposed to be spaced away from wall surface 110 to some extent. However, such restriction in disposing rack 102 reduces the degree of freedom, which is not preferable. When the power supply device is used, it may be difficult to dispose the power supply device leaving a space behind rack 102. For example, in some cases, the power supply device is disposed so that rack 102 closely contacts wall surface 110, and racks 102 are arranged without any gaps between racks 102. In these cases, battery modules 101 of the respective power supply device cannot be cooled effectively. This may lead to degradation of the secondary battery cells and reduced lifetime of the secondary battery cells.

CITATION LIST

Patent Literature

PTL 1: Unexamined Japanese Patent Publication No. 2013-171796

SUMMARY OF THE INVENTION

The present invention has been made in view of the above background. An object of the present invention is to provide a rack-type power supply device in which the degree of freedom of arrangement is improved, the number of cooling fans is less than the number of battery modules, and a difference in cooling capability between the battery modules is eliminated.

A rack-type power supply device according to a first aspect of the present invention includes a plurality of battery modules each of which accommodates a plurality of secondary battery cells, a rack main body that vertically accommodates battery modules in a horizontal posture like a plurality of steps with gaps between the battery modules, and cooling fans that are disposed on a front surface side of the rack main body and blows cooling air into each of the gaps formed between the battery modules. The rack main body includes a back-side duct where cooling air having passed through the gaps flows upward on a back surface side of the battery modules and an air outlet for discharging cooling air having passed through the back-side duct on a top surface side. A number of the cooling fans is less than a number of the battery modules, and each of the cooling fans is disposed to be shifted from each of the gaps formed between the battery modules in front view of the rack main body.

The above configuration reduces the number of the cooling fans used and the cost. In addition, the cooling fan is not disposed in the gap between the battery modules with high blowing efficiency. Instead, the cooling fan is disposed to avoid the gap between battery modules for the purpose of intentionally hindering flow of cooling air. As a result, cooling air is also supplied to a region where cooling air hardly reaches and uniform cooling is achieved.

A rack-type power supply device according to a second aspect of the present invention includes a plurality of battery modules each of which accommodates a plurality of secondary battery cells, a rack main body that vertically accommodates the battery modules in a horizontal posture like a plurality of steps with gaps between the battery modules, and cooling fan that are disposed on a front surface side of the rack main body and blows cooling air into each of the gaps formed between the battery modules. The rack main body includes a back-side duct where cooling air having passed through the gaps flows upward on a back surface side of the battery modules and an air outlet for discharging cooling air having passed through the back-side duct on a top surface side. The back-side duct is partitioned into a first flow path that allows cooling air having passed through the gaps formed between the battery modules accommodated in an upper region of the rack main body to pass and a second flow path that allows cooling air having passed through the gaps formed between the battery modules accommodated in a lower region of the rack main body to pass. A number of the cooling fans is less than a number of the battery modules and the cooling fans are vertically arranged.

The above configuration can reduce the number of the cooling fans used and the cost, and at the same time, achieve uniform cooling. This is because the back-side duct formed on the back surface side of the battery modules is divided into the first flow path and the second flow path. In addition, cooling air having passed through the battery modules arranged in the upper region is caused to pass through the first flow path, whereas cooling air having passed through the battery modules arranged in the lower region is caused to pass through the second flow path. As a result, it is possible to achieve improved flow of cooling air passing through the back-side duct. In particular, the back-side duct is partitioned into the first flow path and the second flow path and cooling air having passed through the battery modules arranged in the lower region is caused to pass through the second flow path. Consequently, it is possible to effectively prevent cooling air having passed through the battery modules in the lower region from remaining in the back-side duct and to achieve efficient blowing through the second flow path. It is thus possible to obtain flow of cooling air blown into the lower region and achieve a uniform air flow as a whole and uniform cooling.

According to a rack-type power supply device of a third aspect of the present invention, the back-side duct includes a partition wall that is placed on a back surface side of the battery modules accommodated in the upper region and that partitions an inside of the back-side duct into a front portion and a back portion, and the front portion on a front surface side of the partition wall is the first flow path and the back portion on a back surface side of the partition wall is the second flow path.

With the above configuration, the back-side duct can be partitioned into the first flow path and the second flow path only by disposing the partition wall in the back-side duct. In particular, cooling air having passed between the battery modules accommodated in the upper region is caused to pass through the first flow path formed on the front surface side of the partition wall, and cooling air having passed between the battery modules accommodated in the lower region is caused to pass through the second flow path formed on the back surface side of the partition wall. Consequently, cooling air having passed between the battery modules vertically arranged like a plurality of steps can be efficiently discharged upward.

According to a rack-type power supply device of a fourth aspect of the present invention, a plurality of the cooling fans are arranged at equal intervals every other battery module, the battery modules being arranged like a plurality of steps.

With the above configuration, the number of the cooling fans arranged on the front surface side of the rack main body is half the number of the battery modules arranged like a plurality of steps and thus the manufacturing cost can be reduced. At the same time, it is possible to achieve uniform flow of cooling air blown into each gap and uniformly cool all the battery modules.

According to a rack-type power supply device of a fifth aspect of the present invention, one of the cooling fans disposed at a bottom on a front surface side of the rack main body is aligned with a bottom battery module among the battery modules accommodated in rack main body.

With the above configuration, the bottom cooling fan is disposed to align with the bottom battery module. This simple configuration can achieve a uniform air flow flowing into each gap between the battery modules and uniform cooling of all the battery modules.

According to a rack-type power supply device of a sixth aspect of the present invention, one of the cooling fans disposed at the bottom on the front surface side of rack main body is aligned with a second battery module from a bottom among the battery modules accommodated in the rack main body.

With the above configuration, the bottom cooling fan is disposed to align with the second battery module from the bottom. This simple configuration can achieve a uniform air flow flowing into each gap between the battery modules and uniform cooling of all the battery modules.

According to a rack-type power supply device of a seventh aspect of the present invention, the rack main body includes an exhaust fan that is placed at the air outlet and discharges cooling air having passed through the back-side duct.

With the above configuration, cooling air that has passed through the gaps between the battery modules that are vertically arranged to flow into the back-side duct can be effectively sucked by the exhaust fan disposed at the air outlet on the top surface side and discharged. In particular, air is forcibly discharged from the air outlet on the top surface side. Consequently, an overall flow of cooling air is promoted and all the battery modules can be cooled more efficiently.

According to a rack-type power supply device of an eighth aspect of the present invention, the rack main body includes a bottom duct that allows cooling air blown from the cooling fan to pass under the bottom battery module, the bottom duct communicates with the back-side duct so as to allow cooling air having passed through the bottom duct to flow into the back-side duct, and a vertical width of the bottom duct is larger than a vertical width of one of the gaps formed between the battery modules.

With the above configuration, a flow of cooling air blown from the bottom cooling fan to the bottom battery module is promoted and a good air flow is achieved near the bottom battery module. In particular, as the vertical width of the bottom duct is larger than the gap between the battery modules, it is possible to effectively achieve a good air flow in the bottom portion and uniformly cool all the battery modules.

According to a rack-type power supply device of a ninth aspect of the present invention, a space between the cooling fans and front surface of each of battery modules that opposes the cooling fans is four times or less as large as a thickness of one of the cooling fans.

With the above configuration, it is possible to uniformly cool all the battery modules without a large space on the front surface side of the battery modules, that is to say, while the compactness of the rack main body is achieved.

A rack-type power supply device according to a tenth aspect of the present invention further includes a power supply controller that controls charge and discharge of a plurality of the battery modules accommodated in the rack main body. The power supply controller is disposed above a top battery module of the battery modules arranged like the plurality of steps, and the power supply controller is cooled with cooling air having passed through the back-side duct.

With the above configuration, the power supply controller controls charge and discharge of the battery modules accommodated in the rack main body, and the power supply controller is disposed above the top battery module. The power supply controller can thus contact cooling air having passed through the back-side duct to be effectively cooled.

According to a rack-type power supply device of an eleventh aspect of the present invention, each of the battery modules includes an output terminal that externally outputs output of the plurality of secondary battery cells built in each of the battery modules on front surface. On a front surface side of the rack main body, a plurality of the output terminals of the battery modules are connected via connection lines to the power supply controller.

With the above configuration, wires for the battery modules are placed on the front surface of the rack main body. This configuration can simplify wiring work and maintenance. In particular, the connection lines for connecting the battery modules and the output terminals are arranged on the front surface side. Consequently, these wired portions can be cooled effectively. These wiring members are arranged on the front surface side of the battery modules to which air is forcibly supplied from the cooling fan. This configuration can effectively prevent foreign matter such as dust from accumulating on these portions and at the same time, and achieve cooling.

DESCRIPTION OF EMBODIMENTS

Exemplary embodiments of the present invention will be described below with reference to the drawings. However, the exemplary embodiments described below show only an example for embodying the technical idea of the present invention, and the present invention is not limited to the following. Further, in the present description, members shown in the scope of claims are not limited to the members of the exemplary embodiments. In particular, it is not intended to limit the sizes, materials, and shapes of components and relative arrangement between the components, which are described in the exemplary embodiments, to the scope of the present invention unless otherwise specified. The sizes and the like are mere explanation examples. However, the sizes and the positional relation of the components in each drawing are exaggerated for clearing the explanation in some cases. Furthermore, in the following description, the same names or the same reference marks denote the same components or the same types of components, and detailed description is therefore appropriately omitted. Regarding the elements constituting the present invention, a plurality of elements may be formed of the same component, and one component may serve as the plurality of elements. To the contrary, the function of one component may be shared by the plurality of components.

A rack-type power supply device according to the present invention can be used as an installation-type power storage facility. The rack-type power supply device can be used for applications including backup power supplies driven in case of power failure at servers, buildings, and factories, power storage for peak-cut, and power drive.

First Exemplary Embodiment

Figure 1:
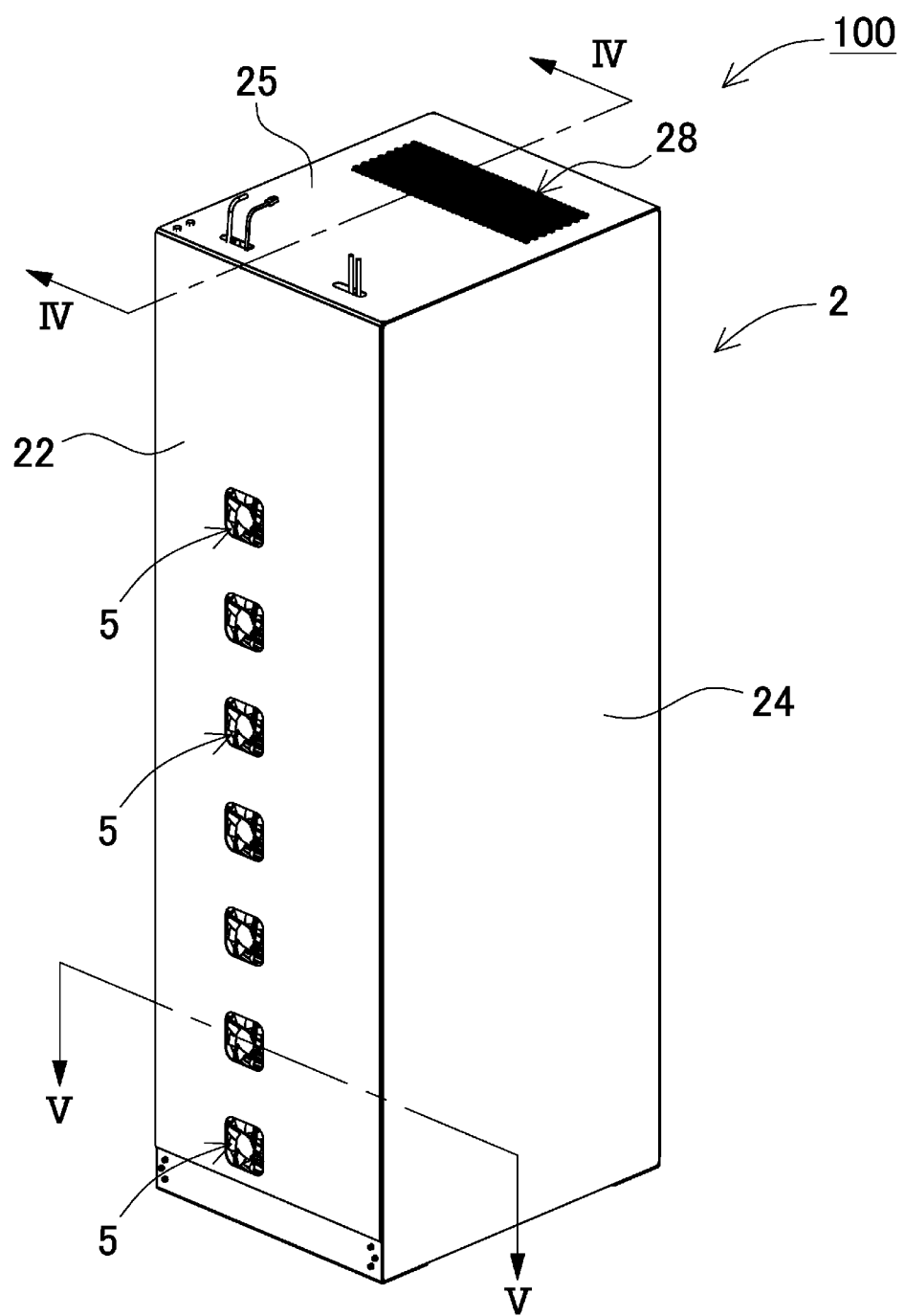
FIG. 1 is a perspective view of a rack-type power supply device according to a first exemplary embodiment of the present invention.
Figure 2:
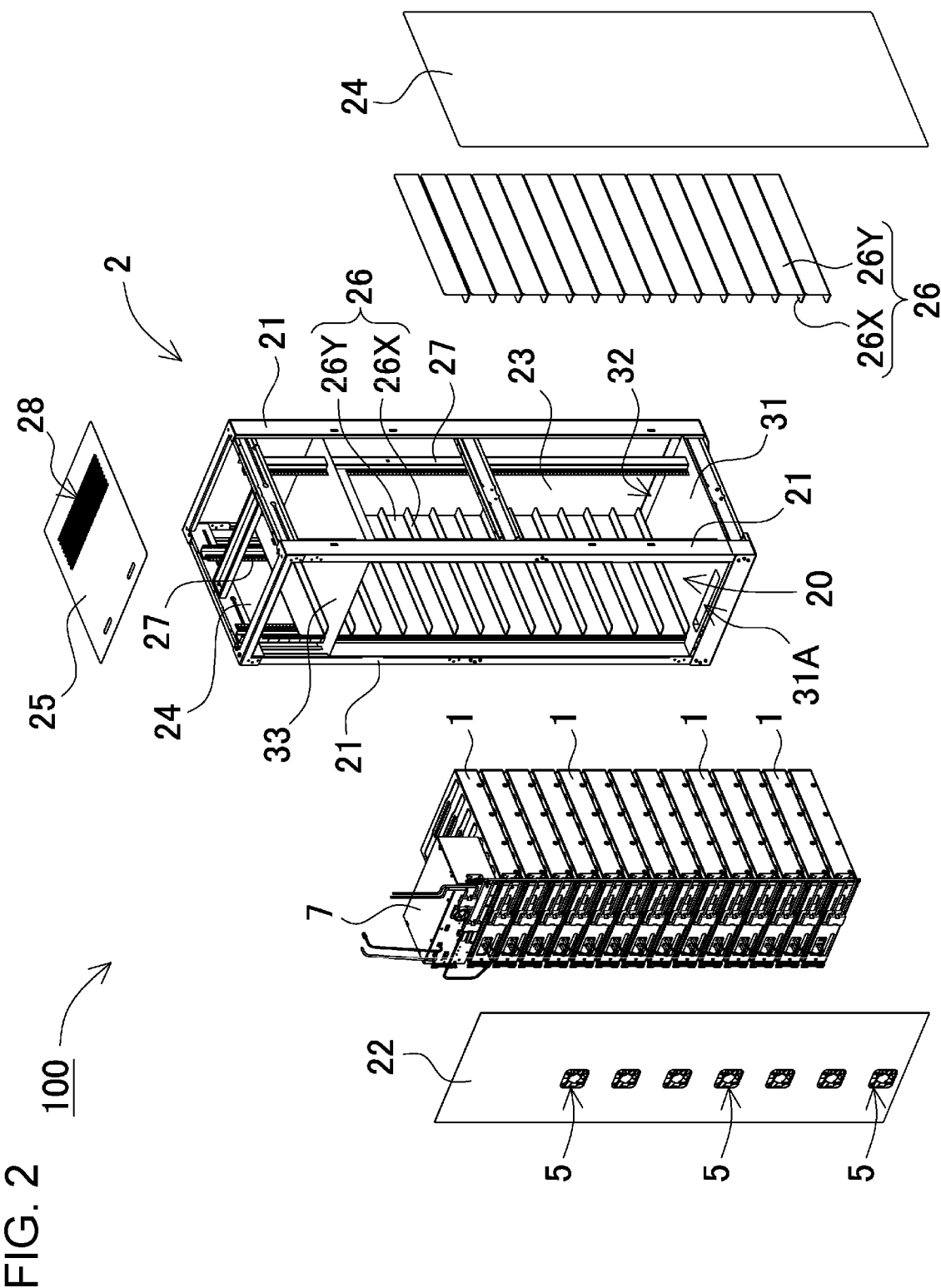
FIG. 2 is an exploded perspective view of the rack-type power supply device illustrated in FIG. 1.
Figure 3:
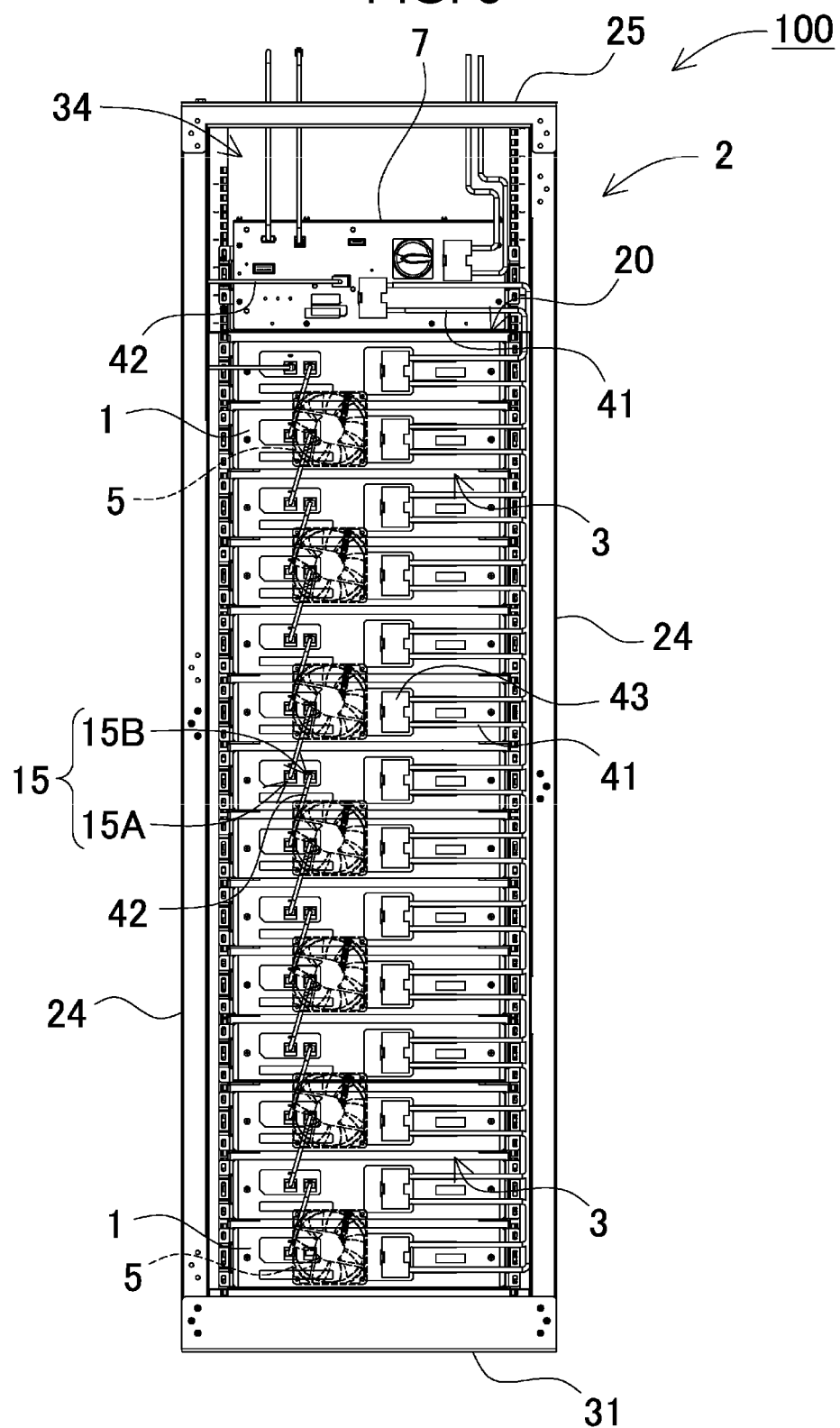
FIG. 3 is a front view of the rack-type power supply device illustrated in FIG. 1 with a front plate removed.
Figure 4:
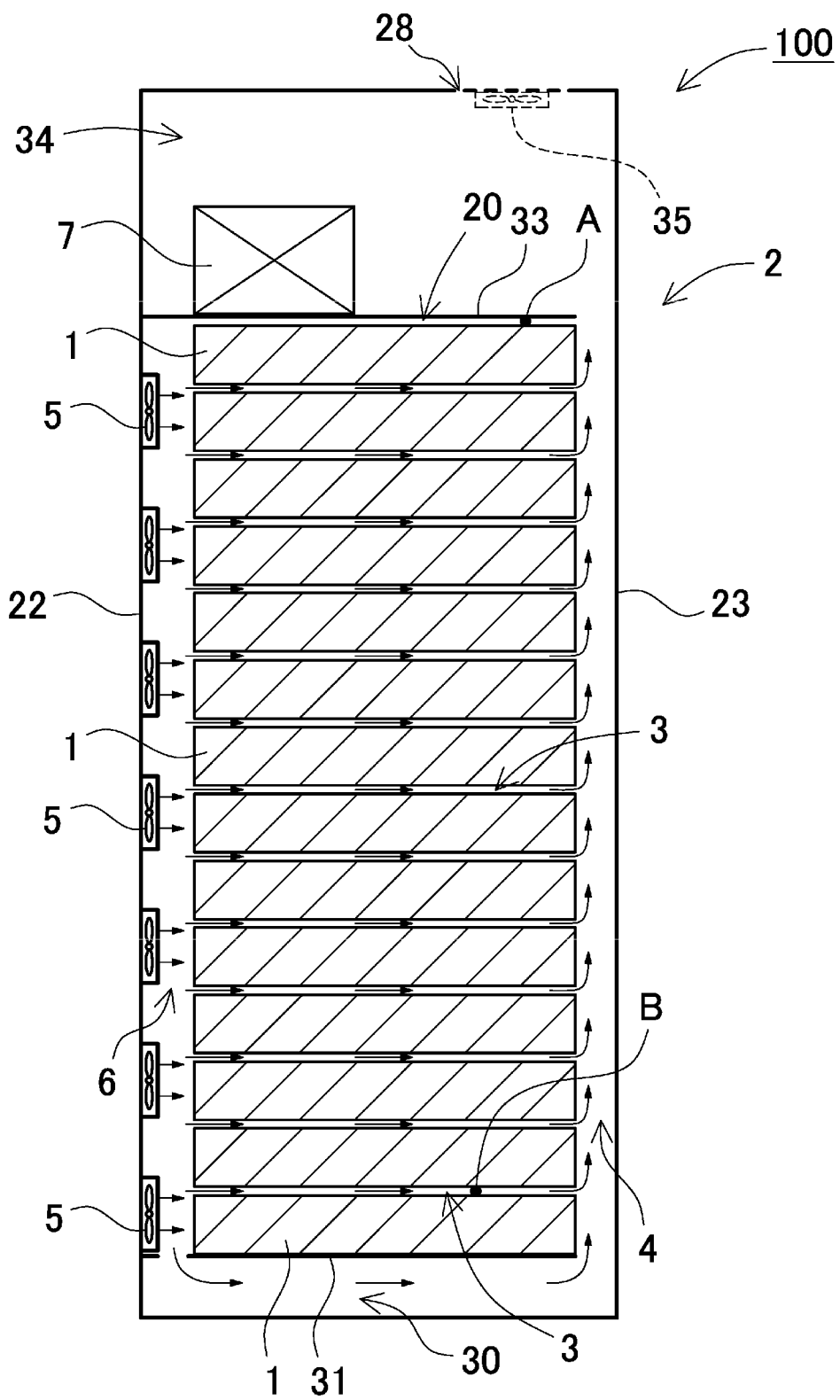
FIG. 4 is a schematic cross-sectional view of the rack-type power supply device taken along line IV-IV of FIG. 1.
Figure 5:
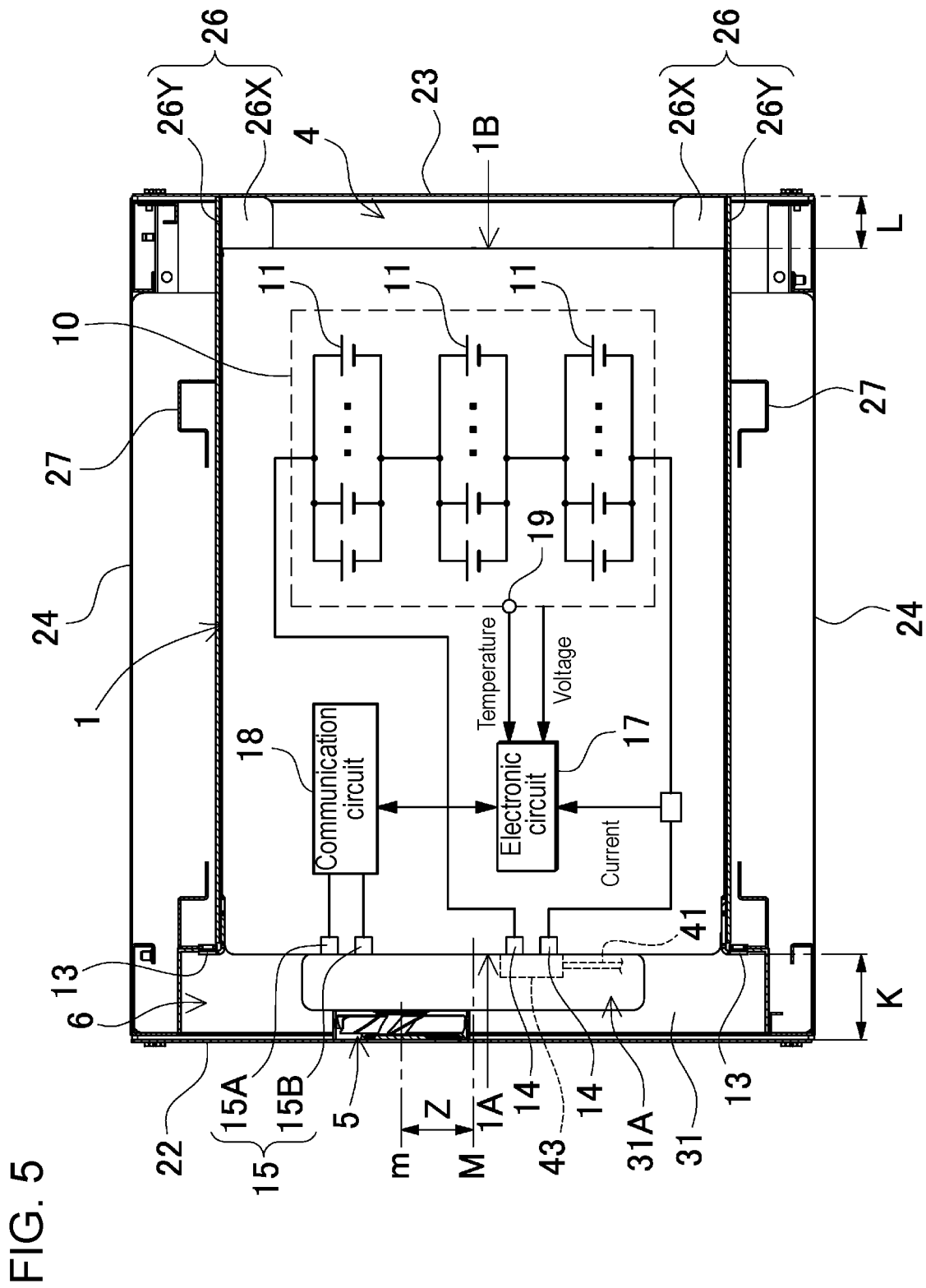
FIG. 5 is a schematic cross-sectional view of the rack-type power supply device taken along line V-V of FIG. 1.

FIGS. 1 to 5 illustrate a rack-type power supply device according to a first exemplary embodiment of the present invention. FIG. 1 is a perspective view of a rack-type power supply device. FIG. 2 is an exploded perspective view of the rack-type power supply device. FIG. 3 is a front view of the rack-type power supply device with a front plate removed. FIG. 4 is a schematic vertical cross-sectional view of the rack-type power supply device. FIG. 5 is a schematic horizontal cross-sectional view of the rack-type power supply device. The rack-type power supply device illustrated in FIGS. 1 to 5 includes a plurality of battery modules 1 each of which accommodates a plurality of secondary battery cells 11, rack main body 2 that accommodates battery modules 1 in a horizontal posture with gaps 3 between battery modules 1 in a vertical direction like a plurality of steps, and a plurality cooling fans 5 that are arranged on a front surface side of the rack main body and blow cooling air into gaps 3 between the battery modules.

The rack-type power supply device illustrated in FIGS. 1 to 5 has a hollow accommodation space 20 inside rack main body 2. Battery modules 1 in a horizontal posture are vertically accommodated in accommodation space 20. Battery modules 1 are arranged with gaps 3 between vertically adjacent battery modules 1. Rack main body 2 includes cooling fans 5 vertically arranged on the front surface side. The number of cooling fans 5 is less than the number of battery modules 1. Rack main body 2 also includes back-side duct 4 in which cooling air having passed through gaps 3 flows upward on a back surface side of battery modules 1. In addition, rack main body 2 includes air outlet 28 for discharging cooling air having passed through back-side duct 4 on a top surface side. Rack-type power supply device described above causes cooling air taken in rack main body 2 by cooling fans 5 to pass from gaps 3 between battery modules 1 to back-side duct 4 and to be discharged from air outlet 28. In this way, the rack-type power supply device cools all battery modules 1 accommodated in accommodation space 20 with cooling air.

(Battery Module 1)

Figure 6:
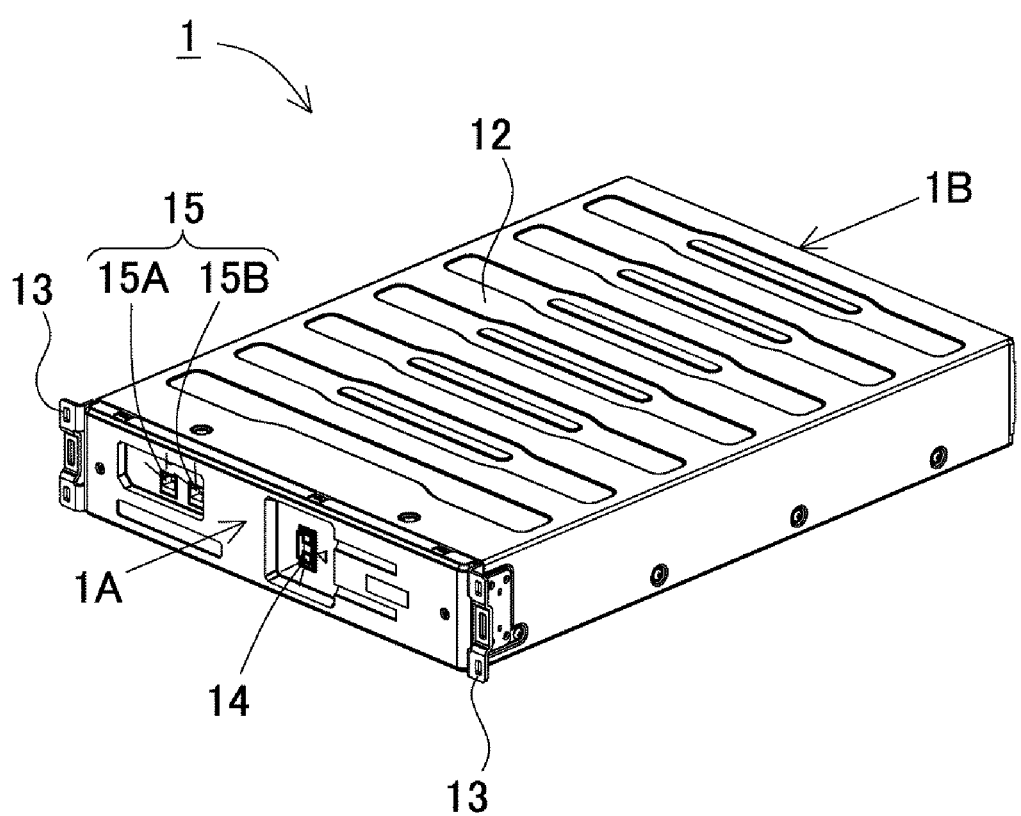
FIG. 6 is a perspective view of a battery module.

As illustrated in FIGS. 5 and 6, battery module 1 includes battery 10 constituted by secondary battery cells 11 that are connected in series and/or in parallel and outer case 12 that accommodates battery 10.

Battery 10 includes secondary battery cells 11 connected in series and parallel and has an output voltage of 803.6 V. Secondary battery cell 11 is a lithium ion secondary battery. Battery 10 uses a lithium ion secondary battery as secondary battery cell 11. Battery 10 thus has large outputs at certain capacity or weight. Instead of the lithium ion battery, a lithium polymer battery and a nickel-hydrogen secondary battery cell can also be used as the secondary battery cell. Consequently, the secondary battery cell is not limited to the lithium ion battery and any chargeable batteries can be used for the secondary battery cell in the present invention. Battery 10 illustrated in the drawing includes temperature sensor 19 for detecting temperature. The temperature sensor may be provided for each secondary battery cell or may monitor only a secondary battery at a specific location.

Outer case 12 has a box shape with thickness as a whole, and accommodates battery 10 constituted by secondary battery cells 11. Outer case 12 is made of a material with good thermal conductivity such as metal. The outer case may be made of resin. Outer case 12 is formed to have the shape and size that allow outer cases 12 to be vertically arranged and accommodated in accommodation space 20 within rack main body 2. Battery module 1 illustrated in the drawing includes positioning flange 13 so as to be inserted in accommodation space 20 of rack main body 2 to a predetermined depth. Positioning flange 13 is formed on both sides of a front surface of outer case 12 to project from the both sides. When accommodated in accommodation space 20 of rack main body 2, battery module 1 is accommodated at a determined position with positioning flange 13 abutting against an opening edge of accommodation space 20 within rack main body 2. Battery module 1 can be fixed by fixing positioning flange 13 to the opening edge of rack main body 2 using a connector such as a set screw.

Battery module 1 also includes electronic circuit 17 and communication circuit 18. Electronic circuit 17 includes a microcomputer for detecting and monitoring the state of secondary battery cells 11. Communication circuit 18 outputs signals such as information detected by electronic circuit 17 to outside and receives signals from outside. Electronic circuit 17 includes various circuits for detecting battery information such as the temperature, voltage, charging and discharging current of secondary battery cells 11, a circuit for detecting and calculating the full charge and remaining capacity of batteries from the battery information, and a protection circuit for monitoring whether batteries operate normally. The information detected by electronic circuit 17 is output via communication circuit 18 to outside.

Battery module 1 further includes positive and negative output terminals 14 connected to an output side of battery 10 on front surface 1A of outer case 12. As illustrated in FIG. 3, in a state where battery modules 1 are accommodated in accommodation space 20 of rack main body 2, positive and negative output terminals 14 are connected by connection lines 41 on front surface 1A of battery module 1. Connection line 41 has wiring connector 43 at both ends. As wiring connectors 43 are fitted into output terminals 14, battery modules 1 are connected to each other by connection lines 41. In power supply device 100 illustrated in the drawings, battery modules 1 that are stacked in the vertical direction are serially connected to each other by connection lines 41. The battery modules may be connected in series and/or in parallel.

Battery modules 1 can be wired on the front surface of rack main body 2 in power supply device 100. This configuration can simplify wiring work and maintenance. In particular, connection lines 41 and output terminals 14 for connecting battery modules 1 are arranged on the front surface of battery module 1. Consequently, these wired portions can be cooled effectively with cooling air from cooling fans 5. These wiring members are arranged on the front surface side of the battery modules to which air is forcibly supplied from the cooling fan. This configuration can effectively prevent foreign matter such as dust from accumulating on these portions and at the same time, and achieve cooling.

Battery module 1 also includes signal terminal 15 for outputting signals from communication circuit 18 built in battery module 1 and inputting signals from external devices on front surface 1A of outer case 12. Signal terminal 15 is constituted by output terminal 15A and input terminal 15B. Input terminal 15B is connected via communication line 42 to adjacent another battery module 1 to receive signals output from battery module 1. Output terminal 15A outputs signals from communication circuit 18 built in battery module 1 and causes signals input from other battery modules 1 to pass through output terminal 15A for output. As described above, input terminals 15B to which signals from other battery modules 1 are input are provided and the signals are output from output terminals 15A. As signals from battery modules 1 can be transmitted in a single channel via communication lines 42, the state of battery modules 1 can be monitored with simplified wiring. The battery module may include a signal terminal constituted by only an output terminal.

(Rack Main Body 2)

Rack main body 2 illustrated in FIGS. 1 to 4 includes support poles 21 at four corner portions. Rack main body 2 is closed by front plate 22, back plate 23, and left and right side plates 24 in four directions. A top surface of rack main body 2 is closed by top plate 25. As a result, the entire appearance of rack main body 2 is a quadrangular prism. Rack main body 2 is hollow and has accommodation space 20 in which battery modules 1 are vertically accommodated like a plurality of steps. Rack main body 2 accommodates battery modules 1 in a horizontal posture like steps with gaps 3 between battery modules 1.

Rack main body 2 includes positioning members for battery modules 1 so that battery modules 1 in a horizontal posture are arranged with predetermined gaps between battery modules 1. In rack main body 2 illustrated in the drawings, a plurality of positioning plates 26 are vertically arranged as the positioning members. Positioning plate 26 is a metal plate that is bent to have an L-shaped cross-section. Positioning plate 26 is constituted by vertical part 26Y disposed along a side surface of battery module 1 and a support part 26X that supports a bottom surface of battery module 1 on both sides. Rack main body 2 illustrated in FIG. 1 includes a pair of support frames 27 on both sides of accommodation space 20 and between side plates 24. Support frame 27 is disposed in a vertical posture. Positioning plates 26 are vertically arranged and fixed inside paired support frames 27. Positioning plates 26 are arranged so that support parts 26X in a horizontal posture project inward from a side surface of accommodation space 20. In rack main body 2, accommodation space 20 is partitioned into a plurality of spaces, and the same time, battery module 1 is mounted on top surfaces of opposing support parts 26X. In this way, battery modules 1 can be supported with predetermined gaps between battery modules 1.

In rack main body 2 illustrated in the drawings, the space between vertical parts 26Y of left and right opposing positioning plates 26 is equal to the lateral width of battery module 1. In addition, positioning plates 26 are vertically arranged without any gaps between positioning plates 26 for the purpose of preventing cooling air from leaking from the gaps. In the rack main body, to prevent cooling air blown into the accommodation space from leaking in the lateral direction of the battery module, an air leakage prevention member (not shown) may be disposed outside or inside the vertical part of the positioning plate. Rack main body 2 described above enables cooling air blown into gaps 3 between battery modules 1 arranged like a plurality of steps to pass to the back surface side without leaking from the both sides of rack main body 2. Positioning plates 26 do not need to be configured to completely prevent air leakage. Positioning plate 26 may be configured to allow air leakage to some extent. This is because of the following reason. In rack main body 2 illustrated in the drawings, the outside of positioning plates 26 is covered by side plate 24. If air leaks from positioning plates 26 to outside, the air is prevented from leaking outside of side plate 24.

Figure 7:
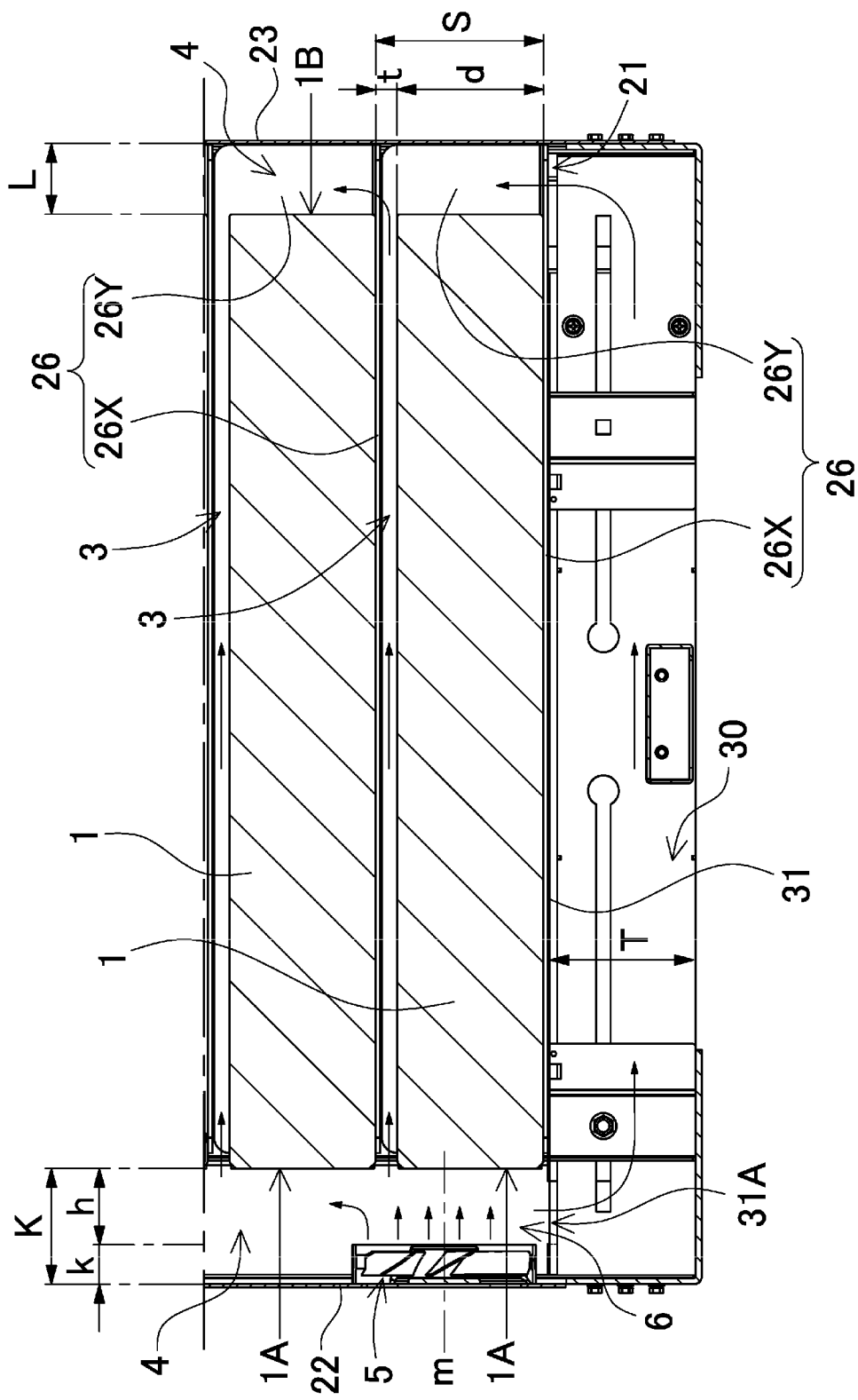
FIG. 7 is an enlarged cross-sectional view of a main part of the rack-type power supply device illustrated in FIG. 1.

In rack main body 2 illustrated in the drawings, support parts 26X that respectively project inward from positioning plates 26 are arranged in the vertical direction like a plurality of steps. Battery module 1 is accommodated in each step. Rack main body 2 illustrated in FIGS. 1 to 4 has 14 support parts 26X arranged in the vertical direction. Each support part 26X in a horizontal posture extends in a longitudinal direction. Battery modules 1 can be arranged in accommodation space 20 while the horizontal posture of each battery module 1 is supported by support parts 26X. In rack main body 2, as illustrated in FIG. 7, the pitch between positioning plates 26 arranged in the vertical direction, that is, space (5) between support parts 26X projecting into accommodation space 20 is larger than thickness (d) of battery module 1. Gap 3 with predetermined vertical width (t) is thus formed between battery modules 1 stacked in the vertical direction. Space (5) between support parts 26X arranged in the vertical direction can be obtained by adding thickness (d) of battery module 1 to vertical width (t) of gap 3. In rack main body 2, battery modules 1 can thus be accurately arranged at determined positions in accommodation space 20 with gaps 3 having predetermined vertical width (t) between battery modules 1.

In rack main body 2 described above, battery module 1 can be inserted along an inner surface of vertical part 26Y and a top surface of support part 26X of positioning plate 26 on the both sides of rack main body 2 while being positioned. Alternatively, the rack main body may include a step part or a guide rail on both side surfaces of the accommodation space. The battery module can be inserted while being guided by these step part and guide rail. In the rack main body, the positioning member may be a support plate that supports the entire battery module from below. According to such a rack main body, the space between upper and lower support plates is larger than the thickness of the battery module. Consequently, the battery modules can be arranged like a plurality of steps with gaps having a predetermined vertical width between the battery modules that are stacked in the vertical direction. In this case, heat is conducted from the battery module disposed on the top surface of the support plate via the support plate to cooling air blown into the gap. If the support plate has a slit or a through-hole, cooling air can be blown while directly contacting the bottom surface of the battery module.

Rack main body 2 is configured that battery modules 1 are inserted to a predetermined depth of accommodation space 20. As illustrated in FIGS. 4, 5, and 7, rack main body 2 has a space between back surface 1B of each battery module 1 accommodated in accommodation space 20 and back plate 23. This space is used as back-side duct 4 that causes cooling air having passed through gap 3 between battery modules 1 to pass. By adjusting the insertion position of battery module 1 accommodated in accommodation space 20 of rack main body 2, longitudinal width (L) of back-side duct 4 formed on the back surface side of battery module 1 can be determined. If longitudinal width (L) of back-side duct 4 is increased in rack main body 2, cooling air having passed through gaps 3 arranged in the vertical direction can efficiently pass through back-side duct 4 to flow into the top surface side of rack main body 2. However, the outer size of rack main body 2 increases as a whole. On the contrary, if longitudinal width (L) of back-side duct 4 is reduced, the outer side of rack main body 2 is reduced and compact rack main body 2 can be obtained. However, cooling air having passed through gaps 3 cannot efficiently pass through back-side duct 4. Consequently, longitudinal width (L) of back-side duct 4 formed in rack main body 2 is determined to be an optimal width by reflecting the number of battery modules 1 and cooling fans 5 arranged in the vertical direction, the blowing amount of cooling fan 5, the size of battery module 1, and other factors. Longitudinal width (L) of back-side duct 4 can be one tenth to once, preferably one fifth to three fifth as large as a number calculated by multiplying vertical width (t) of gap 3 between battery modules 1 by the number of the battery modules, for example.

In rack main body 2, the front surface side of battery module 1 is closed by front plate 22 with battery modules 1 being accommodated vertically in accommodation space 20 like a plurality of steps. Cooling fans 5 are arranged vertically on front plate 22. Rack main body 2 has blowing space 6 between front surface 1A of each battery module 1 and front plate 22. Blowing space 6 is formed to circulate cooling air blown from cooling fans 5 fixed on front plate 22 and cause cooling air to flow into gap 3 between battery modules 1. If longitudinal width (K) of blowing space 6 is increased, cooling air blown from cooling fan 5 easily flows into gap 3 between battery modules 1. However, the outer size of rack main body 2 is increased. On the other hand, if longitudinal width (K) of blowing space 6 is reduced, the outer size of rack main body 2 is reduced and compact rack main body 2 can be obtained. However, cooling air blown from cooling fan 5 hardly circulates in blowing space 6. Consequently, longitudinal width (K) of blowing space 6 can be 1.5 times to 5 times, preferably twice to four times as large as thickness (k) of cooling fan 5, for example. Space (h) between cooling fan 5 and front surface 1A of battery module 1 opposing cooling fan 5 can be thus 0.5 times to 4 times, preferably once to three times as large as thickness (k) of the cooling fan.

In rack main body 2 illustrated in the drawings, the number of cooling fans 5 arranged on front plate 22 is less than the number of battery modules 1 arranged in accommodation space 20. In power supply device 100 according to the first exemplary embodiment, the number of cooling fans 5 arranged on the front surface side is less than the number of battery modules 1 that are vertically arranged, specifically, is approximately half the number of battery modules 1. As cooling fans 5 are disposed at unique positions, all battery modules 1 are efficiently cooled by a small number of cooling fans 5. In the power supply device according to the first exemplary embodiment illustrated in FIG. 3, 14 battery modules 1 are vertically arranged like 14 steps and 7 cooling fans 5 are arranged on the front surface side of battery modules 1. That is, one cooling fan 5 is arranged to oppose two battery modules arranged like steps in power supply device 100.

It is assumed that the number of cooling fans 5 is half the number of battery modules 1 and one cooling fan 5 is disposed for two battery modules 1 arranged like steps. As in a power supply device according to a reference example illustrated in FIG. 8, cooling fan 95 is disposed to oppose gap 93 between two battery modules 91 arranged like steps. Cooling air can thus be effectively blown into gap 93. That is, cooling fan 95 is disposed so that a central axis of cooling fan 95 aligns with gap 93 between battery modules 91. This configuration enables cooling air to be efficiently blown into gap 93. In this case, cooling air can be effectively blown into gap 93A opposing a front surface of cooling fan 95. However, cooling air is hardly blown into gap 93B located between cooling fans 95 that are vertically arranged to be spaced away from each other. A difference in air flow is thus generated between gap 93A opposing cooling fan 95 and gap 93B located between cooling fans 95, and battery modules 91 cannot be cooled uniformly.

Figure 8:
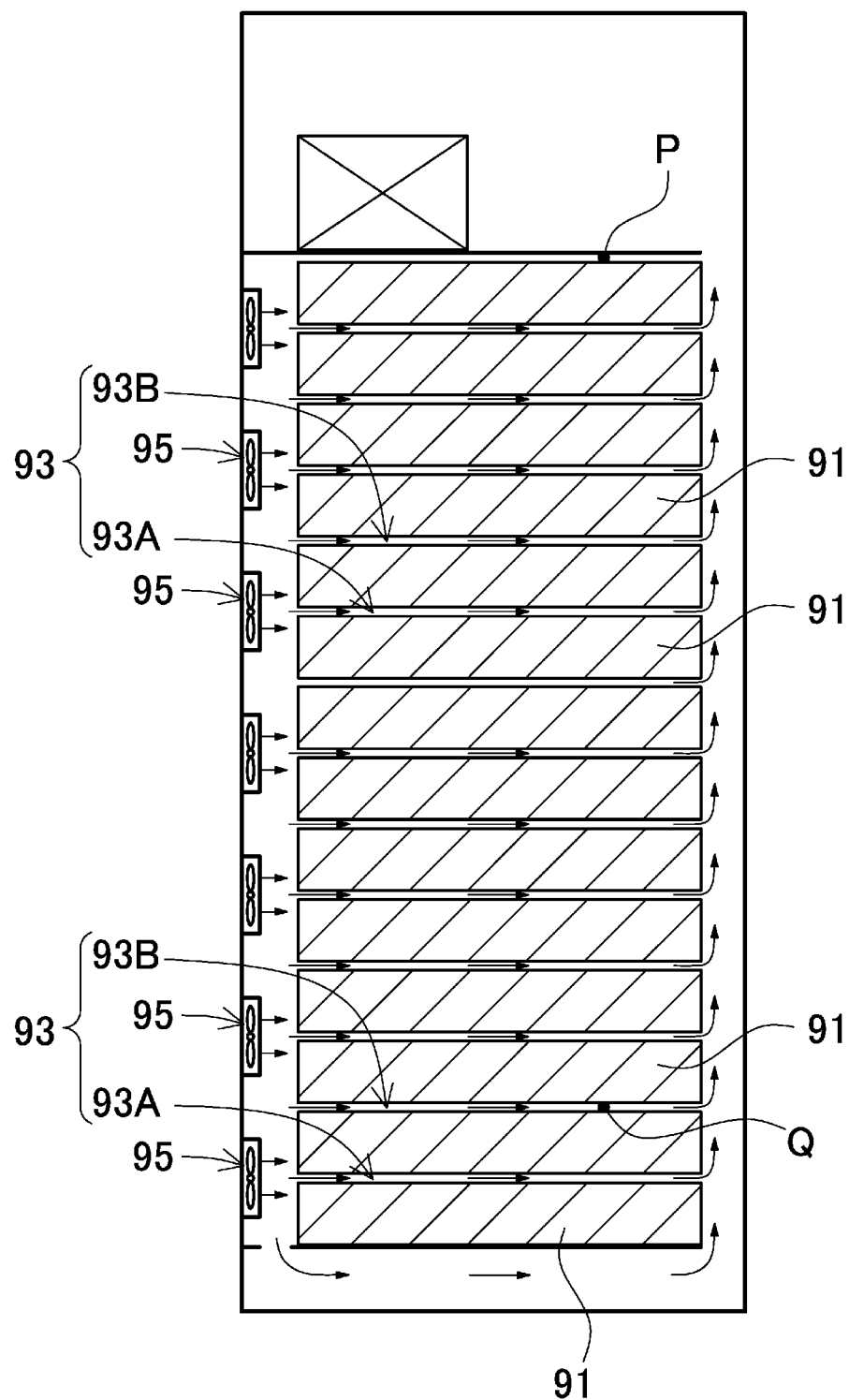
FIG. 8 is a schematic cross-sectional view of a power supply device according to a reference example.

In the power supply device illustrated in FIG. 8, the flow rate of cooling air flowing into each gap 93 is maximized in gap 93 formed on top battery module 91 (indicated by point P in the drawing). The flow rate of cooling air flowing into this gap 93 is 6.1 m/s. In the power supply device illustrated in FIG. 8, the flow rate of cooling air flowing into each gap 93 is minimized in gap 93 formed between second battery module 91 from the bottom and third battery module 91 from the bottom (indicated by point Q in the drawing). The flow rate of cooling air flowing into this gap 93 is 0.6 m/s. Consequently, in the power supply device, the maximum difference in flow rate is 5.5 m/s, which is difficult to uniformly cool all battery modules 1.

In contrast, power supply device 100 according to the first exemplary embodiment of the present invention is configured to dispose one cooling fan 5 for two battery modules arranged like steps and cool the battery modules. To achieve a uniform flow of cooling air blown into gap 3 between battery modules 1, cooling fan 5 disposed on the front surface side of rack main body 2 is shifted from gap 3 between battery modules 1 in front view of rack main body 2. In power supply device 100 illustrated in FIGS. 4 and 7, bottom cooling fan 5 among cooling fans 5 arranged on the front surface side is disposed to align with bottom battery module 1 among battery modules 1 arranged like a plurality of steps. In addition, cooling fans 5 are arranged at equal intervals every other battery module 1, battery modules 1 being arranged like a plurality of steps. Consequently, in power supply device 100, top cooling fan 5 among cooling fans 5 is disposed to align with second battery module 1 from the top.

In the present description, "cooling fan 5 is disposed to align with a battery module" means as follows. That is, as illustrated in FIG. 7, center axis m of cooling fan 5 in a blowing direction crosses front surface 1A of battery module 1 in a side view. Assuming that the vertical thickness of battery module 1 is 100, central axis m of cooling fan 5 is disposed in a region that is 10 to 90 of the thickness of battery module 1, preferably 20 to 80 of the thickness of battery module 1, and more preferably 30 to 70 of the thickness of battery module 1. In power supply device 100 illustrated in FIG. 7, cooling fan 5 is disposed so that central axis m of cooling fan 5 is placed to be slightly higher than a center of the thickness of battery module 1, specifically, at a position that is approximately 70 of a height of battery module 1, which is 100.

As described above, cooling fan 5 disposed on the front surface side of rack main body 2 is shifted from gap 3 between battery modules 1, in particular, aligned with battery module 1. Flows of cooling air supplied to all gaps 3 are approximated and thus all battery modules 1 are uniformly cooled. According to this configuration, cooling fan 5 is not disposed in the space between battery modules 1 with high blowing efficiency. Instead, cooling fan 5 is disposed to avoid gap 3 between battery modules 1 for the purpose of intentionally hindering a flow of cooling air. Cooling air is thus supplied to a region where cooling air hardly reaches, for example, gap 3 farthest from cooling fan 5. As a result, the difference in flow rate between gaps 3 is reduced.

In the power supply device according to the first exemplary embodiment illustrated in FIG. 4, the flow rate of cooling air flowing into each gap 3 is maximized in gap 3 formed on top battery module 1 (indicated by point A in the drawing). The flow rate of cooling air flowing in this gap 3 is 5.9 m/s. In the power supply device illustrated in FIG. 4, the flow rate of cooling air flowing into each gap 3 is minimized in gap 3 formed between bottom battery module 1 and second battery module from the bottom (indicated by point B in the drawing). The flow rate of cooling air flowing in this gap 3 is 0.7 m/s. Consequently, in this power supply device, the maximum difference in flow rate is 5.2 m/s that improves by approximately 5% as compared to the power supply device according to the reference example illustrated in FIG. 8. In particular, bottom cooling fan 5 is disposed to align with bottom battery module 1 and cooling fans 5 are arranged at equal intervals every other battery module 1. This simple configuration can reduce the difference in air flow into gap 3 between battery modules 1. Conditions in the power supply device illustrated in FIG. 4 are the same as those of the power supply device illustrated in FIG. 8 except for the arrangement of cooling fans. Axial propeller fans having a maximum flow rate of 1.5 m/s to 4 m/s are used as the cooling fans in these power supply devices.

As illustrated in FIG. 7, in power supply device 100 illustrated in FIGS. 1 to 3, a lateral position of cooling fan 5 disposed to oppose front surface 1A of battery module 1 is deviated from center line M of battery module 1 in a lateral direction. As illustrated in FIGS. 3 and 5, in the power supply device, connection lines 41 are arranged on the side of front surface 1A of battery module 1. In particular, wiring connector 43 for connecting connection line 41 to output terminal 14 is disposed on front surface 1A of battery module 1. In battery module 1 illustrated in FIGS. 5 and 6, output terminal 14 to which wiring connector 43 is connected is disposed near center line M of battery module 1 in the lateral direction. If cooling fan 5 is disposed near center line M of battery module 1, cooling fan 5 overlaps wiring connector 43 and air may be prevented from being blown into gap 3 between battery modules 1. As cooling fan 5 is shifted from center line M of battery module 1 in the lateral direction as illustrated in FIGS. 3 and 5, it is possible to reduce pressure loss.

In power supply device 100 illustrated in the drawings, cooling fan 5 is disposed to be deviated to the left in front view. However, various wiring members such as connection line 41, wiring connector 43, and communication line 42 are disposed on front surface 1A of battery module 1 in the power supply device, and thus the position of cooling fan 5 may be appropriately changed. In the power supply device, central axis m of cooling fan 5 may be substantially aligned with center line M of battery module 1. In the power supply device, deviation amount (Z) of central axis m of cooling fan 5 relative to central axis M of battery module 1 can be 50% to 75% of the lateral width of battery module 1, for example. Cooling fans 5 are vertically and linearly arranged in rack main body 2 illustrated in FIGS. 1 to 3. However, cooling fans 5 may be alternately disposed on the left and the right with respect to a center line of front plate 22 in the lateral direction. That is to say, cooling fans 5 may be disposed in a zig-zag manner.

Rack main body 2 further includes bottom duct 30 that causes cooling air from cooling fan 5 to pass under bottom battery module 1. In rack main body 2 illustrated in FIGS. 2 and 7, bottom plate 31 is disposed on a bottom surface of bottom battery module 1, and a hollow space is formed below bottom plate 31, which is bottom duct 30. Bottom plate 31 is a metal plate and has inlet port 31A on the front surface side of battery module 1. Inlet port 31A allows cooling air supplied from cooling fan 5 to blowing space 6 to flow into bottom duct 30. A gap is formed between bottom plate 31 and back plate 23 on the back surface side of battery module 1. This gap functions as communicating gap 32 and communicates with back-side duct 4.

In rack main body 2, cooling air from cooling fans 5 is caused to pass through bottom duct 30 at the bottom of blowing space 6 and flow into back-side duct 4. In particular, vertical width (T) of bottom duct 30 illustrated in the drawings is larger than vertical width (t) of gap 3 between battery modules 1. Cooling air can be thus effectively blown to the bottom surface of bottom battery module 1 to cool this battery module 1. As bottom duct 30 is provided below bottom battery module 1, the flow rate of cooling air passing through gaps 3 formed in a lower part of accommodation space 20 can be increased to reduce variations in flow rate of entire rack main body 2. Vertical width (T) of bottom duct 30 can be twice to ten times, preferably three times to eight times as large as vertical width (t) of gap 3 between battery modules 1, for example.

Rack main body 2 includes air outlet 28 formed in top plate 25. In rack main body 2 illustrated in FIGS. 1 to 3, a plurality of through-holes are formed in a region on the back surface side of top plate 25 as air outlet 28. The through-holes that are open in top plate 25 are like holes in a porous plate. This configuration can avoid entrance of foreign matter and other matters while the opening area of air outlet 28 is increased. Top plate 25 illustrated in the drawings is disposed in the region on the back surface side to oppose an upper end opening of back-side duct 4. Rack main body 2 including air outlet 28 configured as described above can efficiently discharge cooling air having passed through back-side duct 4 to outside. Although not illustrated in the drawings, the air outlet may be formed in the entire surface of the top plate.

Rack main body 2 illustrated in the drawings further includes partitioned chamber 34 below top plate 25 and above top battery module 1. Partitioned chamber 34 is partitioned from accommodation space 20 of battery module 1. Rack main body 2 includes upper plate 33 on the top surface side of top battery module 1. Upper plate 33 partitions the inside of rack main body 2 into accommodation space 20 and partitioned chamber 34. In rack main body 2, partitioned chamber 34 is used as an accommodation space for power supply controller 7 to be described later. Rack main body 2 illustrated in the drawings is configured that cooling air having passed through back-side duct 4 flows into partitioned chamber 34 and then is discharged from air outlet 28 that is open in top plate 25. Cooling air flowing into partitioned chamber 34 contacts and cools power supply controller 7.

As indicated by chain lines in FIG. 4, rack main body 2 may include exhaust fan 35 at air outlet 28 that is open in top plate 25. Rack main body 2 can forcibly discharge cooling air having passed through back-side duct 4 via exhaust fan 35 to outside. In rack main body 2, exhaust fan 35 can suck cooling air that has passed through gaps 3 between battery modules 1 and flown into the back-side duct and efficiently discharge the cooling air. In particular, air is forcibly discharged from air outlet 28 on the top surface side. Consequently, an overall flow of cooling air is improved and all battery modules 1 can be cooled more efficiently.

(Cooling Fan 5)

Cooling fan 5 is fixed on front plate 22 of rack main body 2, and sucks outside air and forcibly blows air into the inside of rack main body 2. Cooling fan 5 illustrated in the drawings is an axial fan, that is, a propeller fan in which a propeller with a plurality of fins is rotated by a motor. Cooling fans 5 having a maximum flow rate of 1.5 m/s to 4 m/s can be used, for example. In the power supply device, cooling fans 5 are disposed in a predetermined arrangement to oppose the front surface side of battery modules 1 arranged like a plurality of steps.

Second Exemplary Embodiment

Figure 9:
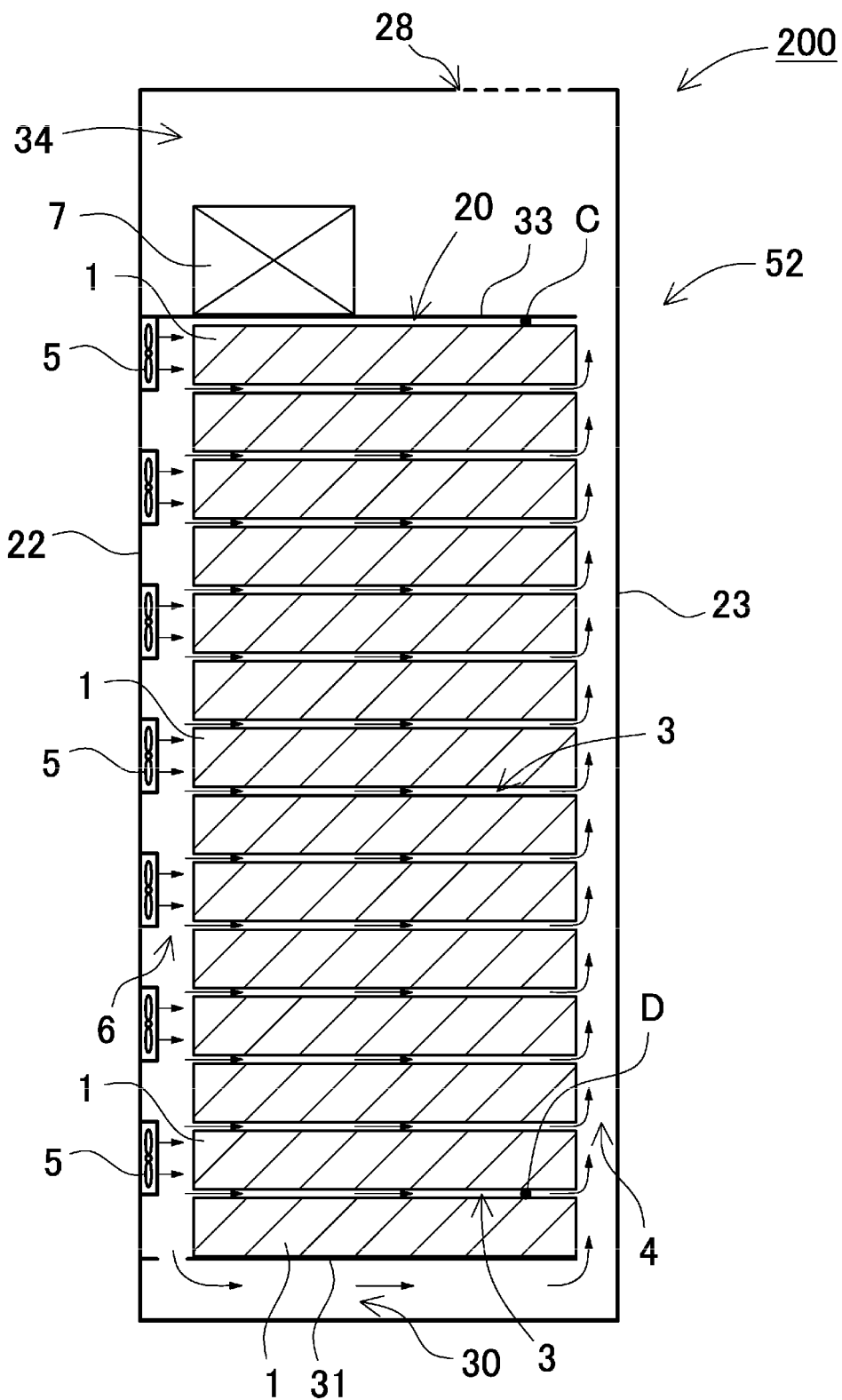
FIG. 9 is a schematic cross-sectional view of a rack-type power supply device according to a second exemplary embodiment of the present invention.

FIG. 9 illustrates a rack-type power supply device according to a second exemplary embodiment of the present invention. In power supply device 200 illustrated in the drawing, 7 cooling fans 5 are arranged for 14 battery modules 1 arranged like a plurality of steps, as in power supply device 100 according to the first exemplary embodiment described above. In power supply device 200, cooling fan 5 is also disposed on a front surface side to be shifted from gap 3 between battery modules 1 in front view of rack main body 52. However, the arrangement of cooling fans 5 is different from that of power supply device 100 according to the first exemplary embodiment described above. Only the arrangement of cooling fans 5 in power supply device 200 is thus described. Other members are denoted by the same reference signs as in the first exemplary embodiment described above, and a description thereof will be omitted.

In power supply device 200 illustrated in FIG. 9, bottom cooling fan 5 among cooling fans 5 arranged on the front surface side is disposed to align with second battery module 1 from the bottom among battery modules 1 arranged like a plurality of steps. Cooling fans 5 are arranged at equal intervals every other battery module 1, battery modules 1 being arranged like a plurality of steps. Consequently, in power supply device 200, top cooling fan 5 among cooling fans 5 is disposed to align with top battery module 1.

In power supply device 200 illustrated in FIG. 9, cooling fan 5 is disposed at a center position of a thickness of battery module 1 to oppose front surface 1A of battery module 1. This configuration enables cooling air blown from cooling fan 5 onto front surface 1A of battery module 1 to be vertically divided and circulated in a good balance and equally flown into gaps 3 formed on and under battery module 1. Each battery module 1 can thus be efficiently cooled with cooling air that is blown on and under each battery module 1 and at the same time, the difference in flow rate of cooling air blown into gaps 3 can be reduced.

In power supply device 200 according to the second exemplary embodiment illustrated in FIG. 9, the flow rate of cooling air flowing into each gap 3 is maximized in gap 3 formed on top battery module 1 (indicated by point C in the drawing). The flow rate of cooling air flowing in this gap 3 is 5.1 m/s. In power supply device 200 illustrated in FIG. 9, the flow rate of cooling air flowing into each gap 3 is minimized in gap 3 formed between bottom battery module 1 and second battery module 1 from the bottom (indicated by point D in the drawing). The flow rate of cooling air flowing in this gap 3 is 0.5 m/s. Consequently, in power supply device 200, the maximum difference in flow rate is 4.6 m/s that improves by approximately 16% as compared to the power supply device according to the reference example illustrated in FIG. 8. In particular, bottom cooling fan 5 is disposed to align with second battery module 1 from the bottom and cooling fans 5 are arranged at equal intervals every other battery module 1. This simple configuration can reduce the difference in flow rate of air flowing in gaps 3 between battery modules 1.

Third Exemplary Embodiment

Figure 10:
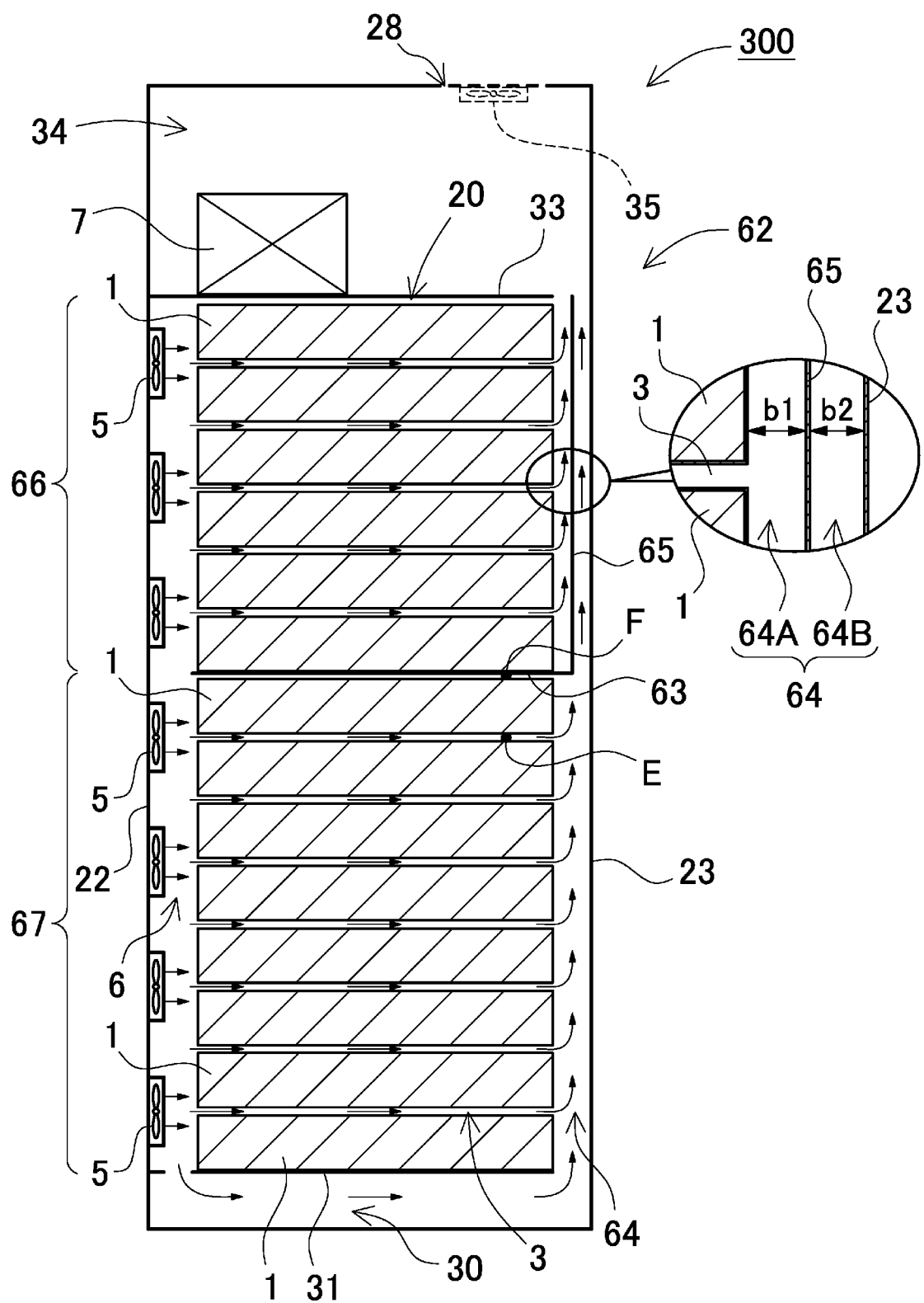
FIG. 10 is a partially enlarged schematic cross-sectional view of a rack-type power supply device according to a third exemplary embodiment of the present invention.

FIG. 10 illustrates a rack-type power supply device according to a third exemplary embodiment of the present invention. In power supply device 300 illustrated in the drawing, back-side duct 64 that is formed on a back surface side of battery modules 1 accommodated in rack main body 62 like a plurality of steps is partitioned into first flow path 64A and second flow path 64B. In rack main body 62 illustrated in FIG. 10, accommodation space 20 that accommodates battery modules 1 is partitioned into upper region 66 and lower region 67. Cooling air having passed through gaps 3 between battery modules 1 accommodated in upper region 66 passes through first flow path 64A. Cooling air having passed through battery modules 1 accommodated in lower region 67 passes through second flow path 64B.

In rack main body 62 illustrated in the drawing, intermediate plate 63 is disposed on a center portion of accommodation space 20 in a vertical direction. Intermediate plate 63 partitions accommodation space 20 into upper region 66 and lower region 67. Rack main body 62 also includes partition wall 65 on the back surface side of battery modules 1 accommodated in upper region 66. Partition wall 65 partitions the inside of back-side duct 64 into a front portion and a back portion. In back-side duct 64, the portion in front of partition wall 65 is first flow path 64A, whereas the portion behind partition wall 65 is second flow path 64B. Partition wall 65 illustrated in the drawing is disposed to be parallel to back plate 23. A lower end of partition wall 65 is coupled to an end edge of intermediate plate 63 on the back surface side, and an upper end of partition wall 65 is extended to an upper end opening of back-side duct 64. Back-side duct 64 is configured that cooling air having passed through gaps 3 between battery modules 1 accommodated in upper region 66 passes through first flow path 64A and cooling air having passed through gaps 3 between battery modules 1 accommodated in lower region 67 passes through second flow path 64B.

The back-side duct does not have to be partitioned into two front and back flow paths by the partition wall. The back-side duct may be partitioned into left and right flow paths or may be partitioned into three or more flow paths. The partition wall does not have to be disposed to be parallel to the back plate. The partition wall may be disposed to be inclined to the back plate. Any configurations of partitioning the inside into a plurality of flow paths by partition walls may be used for the back-side duct.

In back-side duct 64 illustrated in the drawing, longitudinal width (b1) of first flow path 64A is equal to longitudinal width (b2) of second flow path 64B. The longitudinal width of first flow path 64A and second flow path 64B in back-side duct 64 may be adjusted according to the number of battery modules 1 accommodated in upper region 66 and lower region 67. Longitudinal width (b1) of first flow path 64A and longitudinal width (b2) of second flow path 64B are adjusted so as to reduce the maximum difference in flow rate of cooling air blown into gaps 3 between battery modules 1.

Power supply device 300 illustrated in the drawing accommodates 14 battery modules 1. Six battery modules 1 from the top are accommodated in upper region 66 and eight battery modules 1 from the bottom are accommodated in lower region 67 among battery modules 1. As described above, when longitudinal width (b1) of first flow path 64A is equal to longitudinal width (b2) of second flow path 64B, the number of battery modules 1 in upper region 66 is less than the number of battery modules 1 in lower region 67, as described above. Consequently, the difference in flow rate of cooling air blown into all gaps 3 can be reduced. In the power supply device, the number of battery modules 1 in upper region 66 is not limited to six and the number of battery modules 1 in lower region 67 is not limited to eight, and these numbers can be changed.

In power supply device 300, the number of cooling fans 5 is half the number of battery modules 1 and one cooling fan 5 is disposed for two battery modules 1 arranged like steps, as in the power supply device according to the reference example. In particular, cooling fan 5 is disposed to oppose gap 3 between two battery modules 1 arranged like steps. When power supply device 300 is compared to the power supply device according to the reference example, the arrangement of cooling fans 5 is the same but the structure of back-side duct 64 is different. It is thus possible to significantly improve the maximum difference in flow rate of cooling air blown into gaps 3 between battery modules 1.

In power supply device 300 according to the third exemplary embodiment illustrated in FIG. 10, the flow rate of cooling air flowing into each gap 3 is maximized in gap 3 formed under top battery module 1 in lower region 67 (indicated by point E in the drawing). The flow rate of cooling air flowing in this gap 3 is 3.7 m/s. In power supply device 300 illustrated in FIG. 10, the flow rate of cooling air flowing into each gap 3 is minimized in gap 3 formed on top battery module 1 in lower region 67 (indicated by point F in the drawing). The flow rate of cooling air flowing into this gap 3 is 0.9 m/s. Consequently, in this power supply device, the maximum difference in flow rate is 2.8 m/s that improves by approximately 50% as compared to the power supply device according to the reference example illustrated in FIG. 8. As indicated by chain lines in FIG. 11, power supply device 300 includes exhaust fan 35 at air outlet 28 that is open in top plate 25 to further improve the maximum difference in flow rate.

Fourth Exemplary Embodiment

Figure 11:
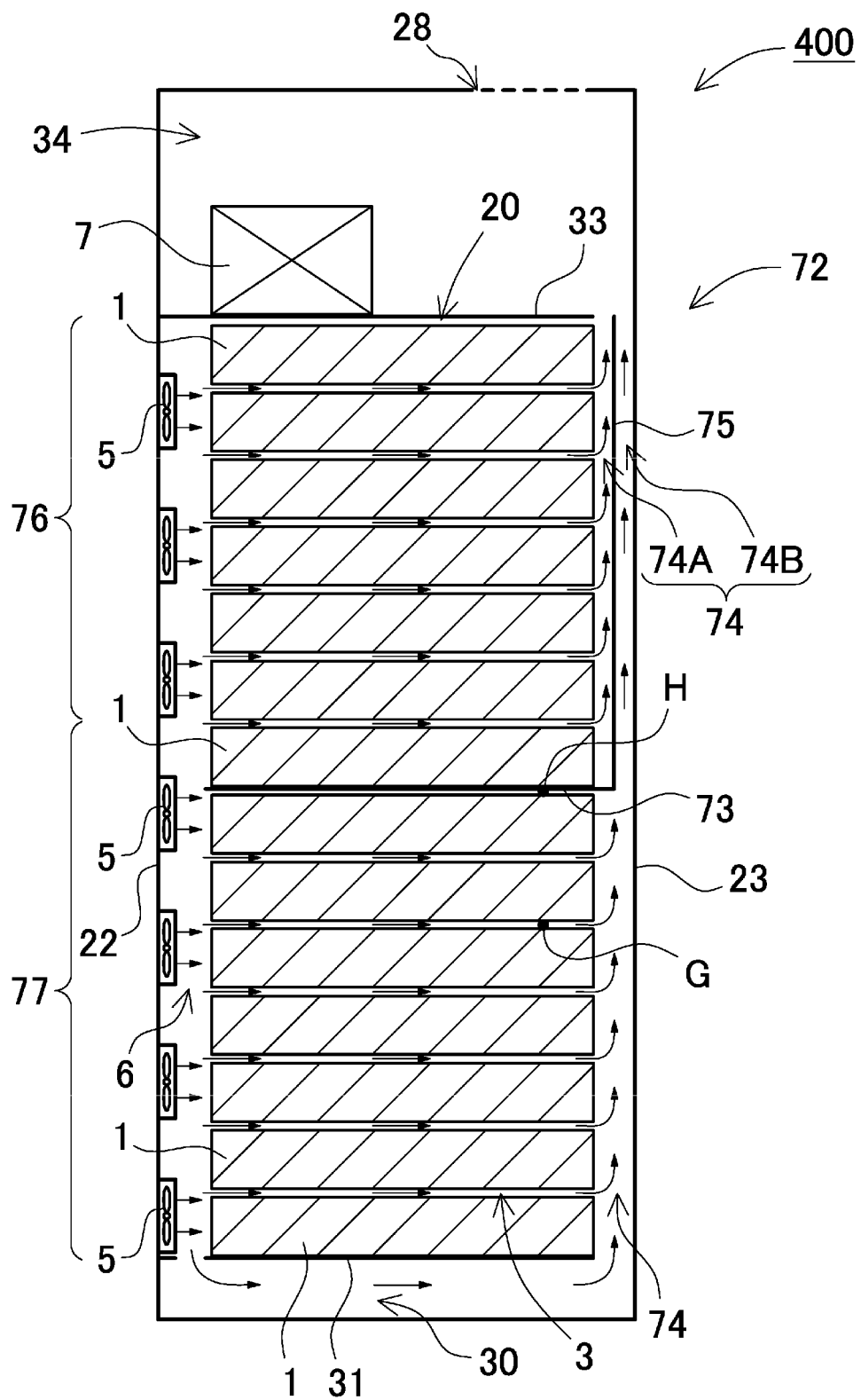
FIG. 11 is a schematic cross-sectional view of a rack-type power supply device according to a fourth exemplary embodiment of the present invention.
Figure 12:
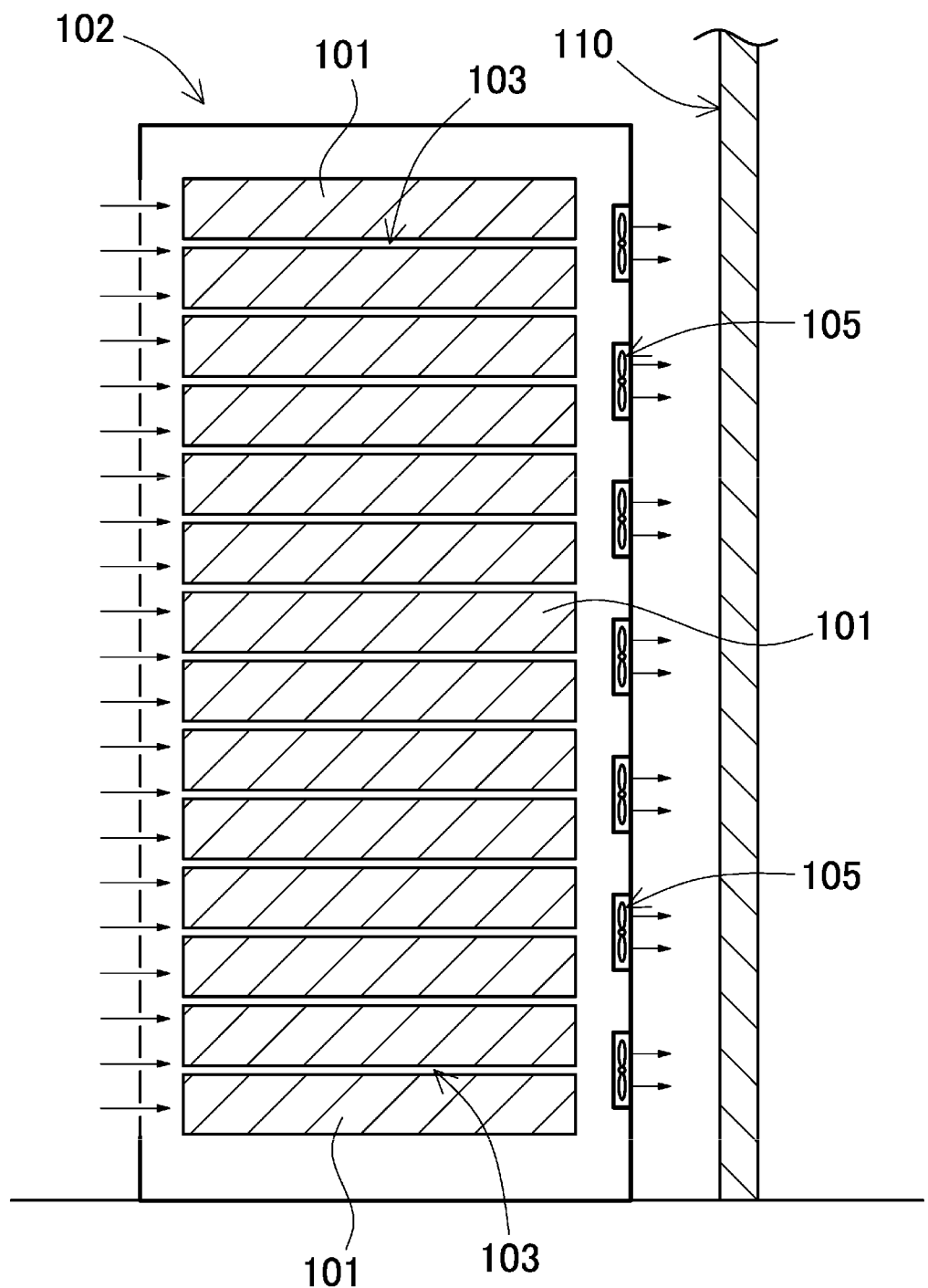
FIG. 12 is a schematic cross-sectional view of a conventional rack-type power supply device.

FIG. 11 illustrates a rack-type power supply device according to a fourth exemplary embodiment of the present invention. In power supply device 400 illustrated in the drawing, intermediate plate 73 is disposed on a center portion of rack main body 72 in a vertical direction. Intermediate plate 73 partitions accommodation space 20 into upper region 76 and lower region 77, and back-side duct 74 is partitioned into first flow path 74A and second flow path 74B by partition wall 75, as in the power supply device according to the third exemplary embodiment. However, power supply device 400 is different from power supply device according to the third exemplary embodiment in the numbers of battery modules 1 accommodated in upper region 76 and lower region 77 and the arrangement of cooling fans 5 disposed on a front surface side.

Power supply device 400 illustrated in FIG. 11 accommodates 14 battery modules 1 in accommodation space 20. Seven battery modules 1 from the top are accommodated in upper region 76 and seven battery modules 1 from the bottom are accommodated in lower region 77. In power supply device 400, one cooling fan 5 is disposed for two battery modules arranged like steps. Bottom cooling fan 5 among cooling fans 5 arranged on the front surface side is disposed to align with bottom battery module 1 among battery modules 1 arranged like a plurality of steps. Cooling fans 5 are arranged at equal intervals every other battery module 1, battery modules 1 being arranged like a plurality of steps. Top cooling fan 5 among cooling fans 5 is disposed to align with second battery module 1 from the top among battery modules 1. In power supply device 400 illustrated in FIG. 11, cooling fan 5 is disposed at a center position of the thickness of battery module 1 to oppose front surface 1A of battery module 1.

In power supply device 400 according to the fourth exemplary embodiment illustrated in FIG. 11, the flow rate of cooling air flowing into each gap 3 is maximized in gap 3 formed under second battery module 1 from the top in lower region 77 (indicated by point G in the drawing). The flow rate of cooling air flowing in this gap 3 is 3.2 m/s. In power supply device 400 illustrated in FIG. 11, the flow rate of cooling air flowing into each gap 3 is minimized in gap 3 formed on top battery module 1 in lower region 77 (indicated by point H in the drawing). The flow rate of cooling air flowing into this gap 3 is 0.8 m/s. Consequently, in power supply device 400, the maximum difference in flow rate is 2.4 m/s that improves by approximately 55% or more as compared to the power supply device according to the reference example illustrated in FIG. 8.

One cooling fan is disposed for two battery modules 1 in the power supply devices according to the first to fourth exemplary embodiments. In a case where an even number of battery modules 1 is arranged, if the number of cooling fans 5 is n, the number of battery modules 1 can be 2n. An odd number of battery modules 1 may be arranged in the power supply device. In such a power supply device, assuming that the number of cooling fans 5 can be n, the number of battery modules 1 can be (2n−1) or (2n+1) Cooling fan 5 is disposed every other battery module 1 in this power supply device. The number of the cooling fans can be thus approximately half the number of the battery modules.

The power supply devices described above include power supply controller 7 that controls charge and discharge of battery modules 1 connected to each other. Battery modules 1 connected in series and/or in parallel are connected to power supply controller 7, and power supply controller 7 controls charge and discharge of secondary battery cells 11 built in battery modules 1. In the power supply device illustrated in FIGS. 1 to 4, power supply controller 7 is accommodated in partitioned chamber 34 formed in the upper portion of rack main body 2. In this power supply device, cooling air that passes through back-side duct 4 provided on the back surface side of rack main body 2 to be discharged to the top surface side is caused to contact power supply controller 7. Power supply controller 7 can thus be cooled with cooling air. Output lines for high voltage output from power supply controller 7 are wired on the top surface side of rack main body 2. The high-voltage output lines can be wired at a high place so as not to be touched by a user, and thus used safely.

In power supply device 100 illustrated in FIG. 3, connection lines 41 are wired so that outputs of all battery modules 1 attached to rack main body 2 are serially connected. Specifically, output terminals 14 with different polarities of battery modules 1 that are adjacent to each other in the vertical direction and attached to rack main body 2 are connected in a row by connection lines 41 including wiring connectors 43. Terminal ends of connection lines 41 connected to top and bottom battery modules 1 are input to power supply controller 7 disposed on the upper portion of rack main body 2. In the power supply device illustrated in the drawings, outputs of 14 battery modules 1 are serially connected. In the power supply device, the output voltage of each battery module 1 is approximately 57 V, and thus the output voltage of the entire power supply device is approximately 800 V. In the power supply device, the output voltage of each battery module may be 30 V to 60 V. Four to fourteen battery modules may be serially connected, so that the output voltage of the entire power supply device is 200 V to 800 V. As described above, the power supply device in which all battery modules 1 are serially connected can achieve very high output voltage.

Wiring of connection lines is not limited to wiring for serially connecting all battery modules. Connection lines are wired so that outputs of a plurality of battery modules attached can be output in a predetermined connection state. The battery modules may be connected to each other in series and parallel in the power supply device. This power supply device has increased discharge current while keeping high output voltage.

After battery modules 1 are accommodated at determined positions in the power supply device described above, output terminals 14 of respective battery modules 1 are wired in serial and/or in parallel by connection lines 41 on the front surface side of rack main body 2. After battery modules 1 are accommodated in rack main body 2 disposed at a predetermined position, the wiring work can be performed at a site where the power supply device is installed. Connection lines 41 can thus be wired efficiently and safely.

According to the power supply device described above, charge and discharge are controlled by power supply controller 7, while a predetermined number of battery modules 1 are attached to rack main body 2.

The invention claimed is:

1. A rack-type power supply device comprising:
a plurality of battery modules each of which accommodates a plurality of secondary battery cells;
a rack main body that vertically accommodates the battery modules in a horizontal posture like a plurality of steps with gaps between the battery modules; and
cooling fans that are disposed on a front surface side of the rack main body and blows cooling air into each of the gaps formed between the battery modules,
wherein
the rack main body includes a back-side duct where cooling air having passed through the gaps flows upward on a back surface side of the battery modules and an air outlet for discharging cooling air having passed through the back-side duct on a top surface side,
a number of the cooling fans is less than a number of the battery modules, and
a center axis of each of the cooling fans in a blowing direction crosses a front surface of a corresponding one of the battery modules, and is disposed in a region that is within 10% to 90% of a total vertical thickness of said corresponding one of the battery modules assuming that the total vertical thickness of said corresponding one of the battery modules is 100%.

2. A rack-type power supply device comprising:
a plurality of battery modules each of which accommodates a plurality of secondary battery cells;
a rack main body that vertically accommodates the battery modules in a horizontal posture like a plurality of steps with gaps between the battery modules; and
cooling fans that are disposed on a front surface side of the rack main body and blows cooling air into each of the gaps formed between the battery modules,
wherein
the rack main body includes a back-side duct where cooling air having passed through the gaps flows upward on a back surface side of the battery modules and an air outlet for discharging cooling air having passed through the back-side duct on a top surface side,
the back-side duct is partitioned into a first flow path that allows cooling air having passed through the gaps formed between the battery modules accommodated in an upper region of the rack main body to pass and a second flow path that allows cooling air having passed through the gaps formed between the battery modules accommodated in a lower region of the rack main body to pass, and
a number of the cooling fans is less than a number of the battery modules, and
a center axis of each of the cooling fans in a blowing direction crosses a front surface of a corresponding one of the battery modules, and is disposed in a region that is within 10% to 90% of a total vertical thickness of said corresponding one of the battery modules assuming that the total vertical thickness of said corresponding one of the battery modules is 100%.

3. The rack-type power supply device according to claim 2, wherein the back-side duct includes a partition wall that is placed on a back surface side of the battery modules accommodated in the upper region and that partitions an inside of the back-side duct into a front portion and a back portion, and the front portion on a front surface side of the partition wall is a first flow path and the back portion on a back surface side of the partition wall is a second flow path.

4. The rack-type power supply device according to claim 1, wherein a plurality of the cooling fans are arranged at equal intervals every other battery module, the battery modules being arranged like a plurality of steps.

5. The rack-type power supply device according to claim 1, wherein one of the cooling fans disposed at a bottom on a front surface side of the rack main body is aligned with a bottom battery module among the battery modules accommodated in the rack main body.

6. The rack-type power supply device according to claim 1, wherein one of the cooling fans disposed at the bottom on the front surface side of the rack main body is aligned with a second battery module from a bottom among the battery modules accommodated in the rack main body.

7. The rack-type power supply device according to claim 1, wherein the rack main body includes an exhaust fan that is placed at the air outlet and discharges cooling air having passed through the back-side duct.

8. The rack-type power supply device according to claim 1, wherein
   the rack main body includes a bottom duct that allows cooling air blown from the cooling fan to pass under a bottom battery module, the bottom duct communicates with the back-side duct so as to allow cooling air having passed through the bottom duct to flow into the back-side duct, and
   a vertical width of the bottom duct is larger than a vertical width of one of the gaps formed between the battery modules.

9. The rack-type power supply device according to claim 1, wherein a space between the cooling fans and a front surface of each of the battery modules that opposes the cooling fans is four times or less as large as a thickness of the cooling fan.

10. The rack-type power supply device according to claim 1, further comprising a power supply controller that controls charge and discharge of the plurality of battery modules accommodated in the rack main body,
    wherein
    the power supply controller is disposed above a top battery module of the battery modules arranged like the plurality of steps, and
    the power supply controller is cooled with cooling air having passed through the back-side duct.

11. The rack-type power supply device according to claim 10, wherein
    each of the battery modules includes an output terminal that outputs to an outside output of the plurality of secondary battery cells built in each of the battery modules on a front surface, and
    on a front surface side of the rack main body, a plurality of the output terminals of the battery modules are connected via connection lines to the power supply controller.

12. The rack-type power supply device according to claim 2, wherein a plurality of the cooling fans are arranged at equal intervals every other battery module, the battery modules being arranged like a plurality of steps.

13. The rack-type power supply device according to claim 2, wherein one of the cooling fans disposed at a bottom on a front surface side of the rack main body is aligned with a bottom battery module among the battery modules accommodated in the rack main body.

14. The rack-type power supply device according to claim 2, wherein one of the cooling fans disposed at the bottom on the front surface side of the rack main body is aligned with a second battery module from a bottom among the battery modules accommodated in the rack main body.

15. The rack-type power supply device according to claim 2, wherein the rack main body includes an exhaust fan that is placed at the air outlet and discharges cooling air having passed through the back-side duct.

16. The rack-type power supply device according to claim 2, wherein
    the rack main body includes a bottom duct that allows cooling air blown from the cooling fan to pass under a bottom battery module, the bottom duct communicates with the back-side duct so as to allow cooling air having passed through the bottom duct to flow into the back-side duct, and
    a vertical width of the bottom duct is larger than a vertical width of one of the gaps formed between the battery modules.

17. The rack-type power supply device according to claim 2, wherein a space between the cooling fans and a front surface of each of the battery modules that opposes the cooling fans is four times or less as large as a thickness of the cooling fan.

18. The rack-type power supply device according to claim 2, further comprising a power supply controller that controls charge and discharge of the plurality of battery modules accommodated in the rack main body,
    wherein
    the power supply controller is disposed above a top battery module of the battery modules arranged like the plurality of steps, and
    the power supply controller is cooled with cooling air having passed through the back-side duct.

* * * * *